July 14, 1936.   L. E. GRAY   2,047,184
DISPENSING AND MEASURING DEVICE
Filed April 9, 1935
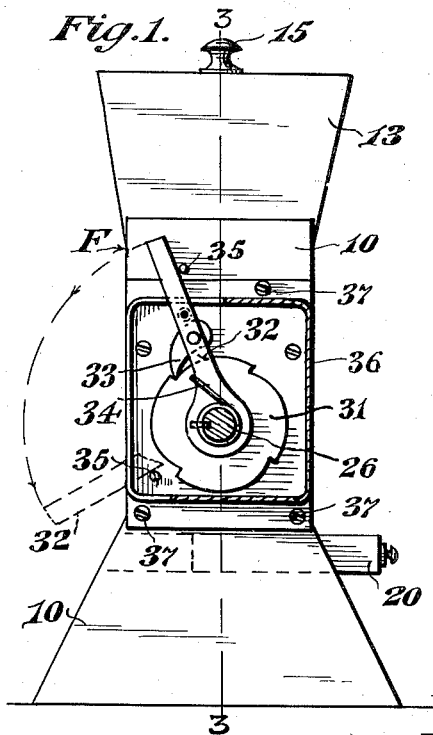
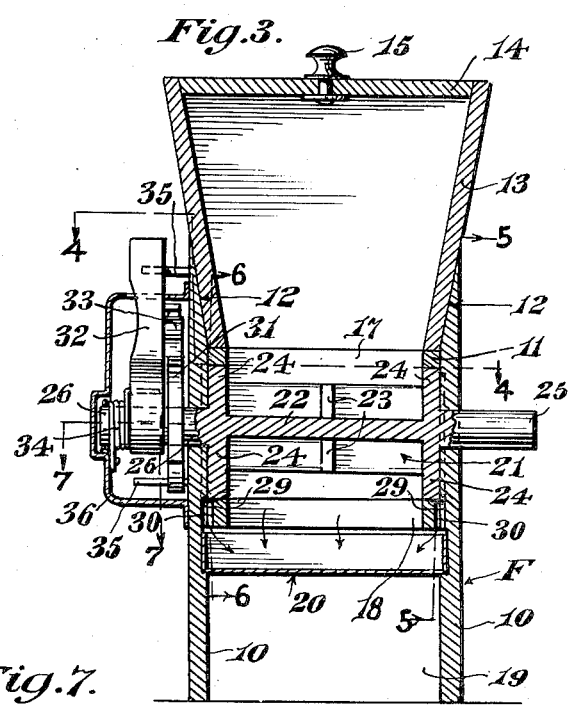
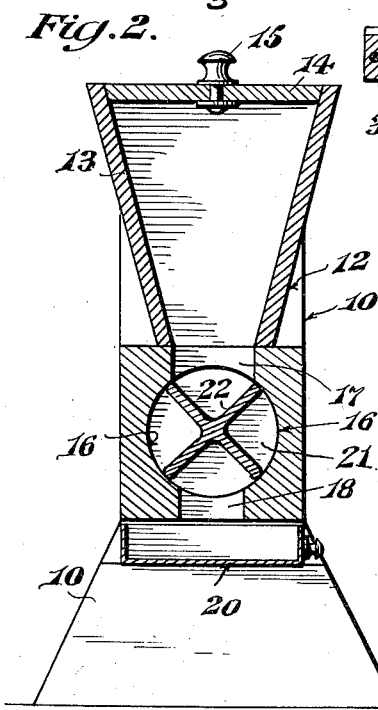
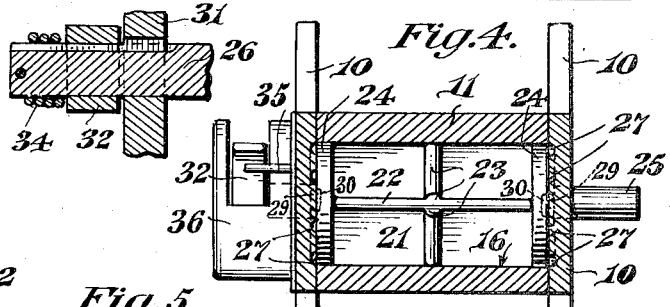
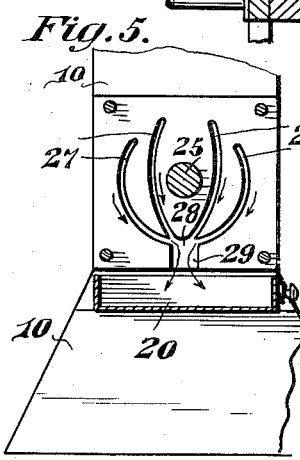
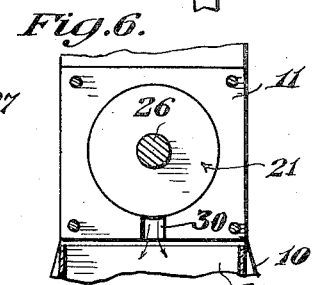
Inventor
Luther E. Gray,
By Irving A. McCathran
Attorney Patented July 14, 1936

2,047,184

UNITED STATES PATENT OFFICE 2,047,184

DISPENSING AND MEASURING DEVICE

Luther E. Gray, Henryville, Ind.

Application April 9, 1935, Serial No. 15,499

1 Claim. (Cl. 221—106)

This invention relates to dispensing and measuring devices and has for its principal object the production of a simple and efficient dispensing and measuring device wherein measured quantities of material may be dispensed from a feeding or reservoir hopper through the manipulation of a spring controlled pawl and ratchet mechanism.

A further object of this invention is the production of a dispensing and measuring device, the mechanical features of which may be adapted for constructing a measuring and dispensing bin for delivering measured quantities of flour, grain, or other material, or in dispensing measured quantities of salt, sugar, liquids, or material for seasoning or sweetening purposes.

A still further object of this invention is the production of a simple and efficient dispensing and measuring device having a rotating measuring drum, the supporting casing for which is provided with draining channels for freeing the ends of the drum from material which might otherwise become packed between the ends of the drum and the supporting casing.

Another object of this invention is the production of a simple and efficient frame for supporting the feeding hopper.

Other objects and advantages of the present invention will appear throughout the following specification and claims.

In the drawing:—

Figure 1 is a side elevation of the dispensing and measuring device, certain parts being shown in section;

Figure 2 is a vertical central sectional view through the improved dispensing and measuring device;

Figure 3 is a vertical section taken on line 3—3 of Figure 1;

Figure 4 is a horizontal section taken on line 4—4 of Figure 3;

Figure 5 is a vertical section taken on line 5—5 of Figure 3, looking in the direction of the arrow;

Figure 6 is a vertical sectional view taken on line 6—6 of Figure 3 looking in the direction of the arrow; and Figure 7 is a detail longitudinal sectional view through one of the supporting shafts for the operating drum taken on line 7—7 of Figure 3.

By referring to the drawing it will be seen that F designates the frame of the device which preferably consists of two substantially similar side plates 10 which are arranged in spaced relation and between these side plates 10 fits a body 11, which body consists preferably of a block-like structure. The plates 10 are provided with beveled or inclined faces 12 near their upper ends and upon the inner faces of the plates to provide an inwardly tapering socket within which socket fits the tapering hopper 13, the lower end of the hopper 13 fitting snugly in contact with the beveled or inclined walls 12 at the upper ends of the plates 10, as shown clearly in Figure 3. The lower end of the hopper 13 rests upon the upper face of the body 11. This is also shown in Figure 3. The hopper 13 may be provided with a removable cover 14 carrying a knob 15.

The body 11 is provided with a central bore 16 and the body 11 is also provided with a longitudinally extending entrance slot 17 at the top thereof and a longitudinally extending discharge or dispensing slot 18 at the bottom thereof, note Figures 2 and 3. The body 11 is preferably located intermediate the upper and lower ends of the plates 10 and in substantial spaced relation from the lower ends of the plates 10 to provide a compartment 19 directly below the body 11, which compartment may be used to place a receptacle therein under the dispensing opening 18 if desired or a drum or other suitable means indicated by the numeral 20 may be mounted as illustrated in Figures 2 and 3.

A dispensing drum 21 is rotatably mounted within the bore 16 and this drum 21 is preferably provided with four partitions or veins 22 formed integral with the drum, the partitions being preferably provided with reinforcing ribs 23 extending transversely thereof upon either side, as shown in Figures 3 and 4. The drum 21 is also provided with circular discs 24 at each end which discs support integral journals 25 and 26, the journals 25 and 26 being journaled in any suitable or desired manner common to the trade within the plates 10 whereby the drum may properly rotate. The discs 24 are adapted to snugly fit against the inner walls of the plates 10 and the inner faces of the walls of the plates 10 adjacent the discs 24 are provided with curved channels 27 which converge at their lower ends at a point indicated by the numeral 28 preferably located below the center of the drum 21, and these converging ends 28 of the channels 27 communicate with a drain opening 29 formed in the inner walls of the plates 10. Suitable drain openings 30 are also provided in the abutting faces of the body 11, as shown in Figure 6, and these drain openings 30 register with the drain openings 29. The purpose of the channels 27 and drain openings 29 and 30 is to drain any particles of material which might get between the ends of the drum 21 or the discs 24 thereof, and the inner faces of the plates 10 and guide these particles down to a point below the drum thereby preventing the binding of the drum which might result in the clogging of this material between the ends of the drum 21 and the plates 10. The shape of these channels and the arrangement thereof in conjunction with the operation of the device will tend to feed this material downwardly toward the discharge ends of the drain openings 29 and 30 and eventually into a receptacle placed below the drain or into the drawer or pan 20.

The shaft 26 carries a ratchet 31 which is fixed to the shaft and an operating lever 32 is loosely mounted upon the shaft 26 to freely swing thereon. This operating lever 32 carries a spring pressed pawl 33 which is adapted to engage the ratchet 31 for rotating the ratchet 31 and the drum 21. A coil spring 34 is fixed at one end and at the other end is secured to the lever 32 so as to constitute a spring return for the lever when it is released. Spaced pins 35 are mounted upon the frame F adjacent the lever 32 and limit the swinging movement of this lever 32, thereby permitting the rotation of the drum sufficient to receive and dispense measured quantities of material. A suitable casing 36 may be secured over the ratchet 31, as shown in Figure 3.

It should be understood that the present mechanical structure is adapted for use in dispensing various kinds of material and it is not desired to limit the particular use for which the structure may be employed. The structure may be used for dispensing large quantities of material such as material for filling bags or other containers, or it may be utilized as a device for depositing a measured quantity of sugar or salt or seasoning material to canned or packed products. The device may be used as a sugar bowl in which event the cup or other receptacle into which the sugar is to be deposited may be placed within the compartment 19 and by operating the lever 32 the drum 21 may be rotated for discharging a measured quantity such as a spoonful of sugar or the like into a cup. The device is also adapted for use in dispensing measured quantities of liquid, such as cream or the like, without departing from the spirit of the invention and as previously stated it should be understood that the drum may be replaced by a receptacle of any character such as a cup or similar receptacle for receiving material dispensed from the measuring and dispensing device.

The hopper may be secured in any suitable or desired manner in connection with the plates 10, such for instance as by screws 37, or in any convenient manner.

It should be understood that certain detail changes in the mechanical construction, combination and arrangement of parts may be employed without departing from the spirit of the invention, so long as such changes fall within the scope of the appended claims.

Having described the invention, what is claimed as new is:—

A dispensing and measuring device comprising a frame having side plates, a body supported by the frame and having a centrally located bore, a rotating measuring drum mounted in said bore and having its ends abutting against said plates, means for rotating said drum whereby material may be dumped in measured quantities from a point above to a point below the drum, said side plates having curved drain channels arranged on the arc of a circle struck from a point substantially at the axis of said drum, said drum having journals for supporting the drum in conjunction with the side plates, the side plates having also outlet drain openings near their lower ends and below said drum, the said drain channels converging toward said drain openings at their lower ends and communicating therewith, the upper ends of said drain channels being curved inwardly toward each other and extending around and above the journals of said drum, some of the drain channels being formed in the side plates adjacent to the contour of the periphery of the drum, and other drain channels extending to a point adjacent the periphery of the drum intermediate the ends of the last mentioned drain channels.

LUTHER E. GRAY.